(12) United States Patent
Samstad (10) Patent No.: US 7,834,587 B1
(45) Date of Patent: Nov. 16, 2010

(54) NON-ISOLATED CHARGER WITH BI-POLAR INPUTS

(75) Inventor: Jeffrey B. Samstad, Brookline, MA (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 12/797,987

(22) Filed: Jun. 10, 2010

Related U.S. Application Data (63) Continuation of application No. 12/061,487, filed on Apr. 2, 2008, now Pat. No. 7,759,900.

(51) Int. Cl.
*H02J 7/00* (2006.01)
*H02J 9/00* (2006.01)

(52) U.S. Cl. .................. 320/128; 320/137; 320/141; 307/66

(58) Field of Classification Search ............... None
See application file for complete search history.

(56) References Cited

U.S. PATENT DOCUMENTS

| | | | |
|---|---|---|---|
| 4,139,846 A | 2/1979 | Conforti |
| 4,217,645 A | 8/1980 | Barry et al. |
| 4,394,741 A | 7/1983 | Lowndes |
| 4,746,854 A | 5/1988 | Baker et al. |
| 4,820,966 A | 4/1989 | Fridman |
| 4,843,299 A | 6/1989 | Hutchings |
| 4,918,368 A | 4/1990 | Baker et al. |
| 4,947,123 A | 8/1990 | Minezawa |
| 4,949,046 A | 8/1990 | Seyfang |
| 4,965,738 A | 10/1990 | Bauer et al. |
| 5,047,961 A | 9/1991 | Simonsen |
| 5,049,804 A | 9/1991 | Hutchings |

(Continued)

FOREIGN PATENT DOCUMENTS

DE 3316251 A1 11/1984

(Continued)

OTHER PUBLICATIONS

Notification of Transmittal of the International Search Report and the Written Opinion of the International Searching Authority, or the Declaration from corresponding International Application No. PCT/US2009/036621, dated Sep. 18, 2009.

*Primary Examiner*—Edward Tso
*Assistant Examiner*—Ramy Ramadan
(74) *Attorney, Agent, or Firm*—Lando & Anastasi, LLP (57) ABSTRACT

Systems and methods are provided for an uninterruptable power supply having a positive DC bus, a neutral DC bus, and a negative DC bus. The uninterruptible power supply includes a battery charger circuit having an inductor, a first charger output, and a second charger output. A first switch connected to a first end of the inductor is configured to couple the positive DC bus with the first charger output. A second switch connected to a second end of the inductor is configured to couple the negative DC bus with the inductor. The neutral DC bus can be coupled to the second charger output. The battery charger circuit can be configured to draw power from at to least one of the positive DC bus and the negative DC bus to charge a battery coupled to the first charger output and the second charger output.

20 Claims, 7 Drawing Sheets

U.S. PATENT DOCUMENTS

| | | |
|---|---|---|
| 5,148,043 A | 9/1992 | Hirata et al. |
| 5,218,288 A | 6/1993 | Mickal et al. |
| 5,266,880 A | 11/1993 | Newland |
| 5,281,955 A | 1/1994 | Reich et al. |
| 5,289,046 A | 2/1994 | Gregorich et al. |
| 5,302,858 A | 4/1994 | Folts |
| 5,315,533 A | 5/1994 | Stich et al. |
| 5,457,377 A | 10/1995 | Jonsson |
| 5,498,950 A | 3/1996 | Ouwerkerk |
| 5,619,076 A | 4/1997 | Layden et al. |
| 5,969,436 A | 10/1999 | Chalasani et al. |
| 6,069,412 A | 5/2000 | Raddi et al. |
| 6,268,711 B1 | 7/2001 | Bearfield |
| 6,274,950 B1 | 8/2001 | Gottlieb et al. |
| 6,400,586 B2 | 6/2002 | Raddi et al. |
| 6,661,678 B2 | 12/2003 | Raddi et al. |
| 6,803,678 B2 | 10/2004 | Gottlieb et al. |
| 6,928,568 B2 | 8/2005 | Breen et al. |
| 6,983,212 B2 | 1/2006 | Burns |
| 7,199,489 B2 | 4/2007 | Gottlieb et al. |
| 7,301,249 B2 | 11/2007 | Stranberg et al. |
| 7,432,615 B2 | 10/2008 | Hjort |
| 7,446,433 B2 | 11/2008 | Masciarelli et al. |
| 7,456,518 B2 | 11/2008 | Hjort et al. |
| 7,456,524 B2 | 11/2008 | Nielsen et al. |
| 2001/0009361 A1 | 7/2001 | Downs et al. |
| 2002/0130648 A1 | 9/2002 | Raddi et al. |
| 2004/0036361 A1 | 2/2004 | Dai et al. |
| 2004/0263123 A1 | 12/2004 | Breen et al. |
| 2005/0029984 A1 | 2/2005 | Cheng et al. |
| 2005/0036248 A1 | 2/2005 | Klikic et al. |
| 2005/0162020 A1 | 7/2005 | Lanni |
| 2005/0162129 A1 | 7/2005 | Mutabdzija et al. |
| 2006/0012341 A1 | 1/2006 | Burns |
| 2006/0192436 A1 | 8/2006 | Stranberg et al. |
| 2007/0064363 A1 | 3/2007 | Nielsen et al. |
| 2007/0262650 A1 | 11/2007 | Li |
| 2008/0042491 A1 | 2/2008 | Klikic et al. |
| 2008/0061628 A1 | 3/2008 | Nielsen et al. |
| 2008/0157602 A1 | 7/2008 | Stranberg et al. |
| 2009/0033283 A1 | 2/2009 | Beg et al. |
| 2009/0231892 A1 | 9/2009 | Klikic et al. |
| 2009/0251002 A1 | 10/2009 | Cohen et al. |

FOREIGN PATENT DOCUMENTS

| | | |
|---|---|---|
| EP | 1324477 A | 7/2003 |

NON-ISOLATED CHARGER WITH BI-POLAR INPUTS

RELATED APPLICATIONS

The present application is a continuation of U.S. patent application Ser. No. 12/061,487 filed on Apr. 2, 2008 now U.S. Pat. No. 7,759,900, entitled "NON-ISOLATED CHARGER WITH BI-POLAR INPUTS," which is incorporated by reference in its entirety.

BACKGROUND OF THE INVENTION

1. Field of the Invention

Embodiments of the present invention relate generally to charging uninterruptable power supply batteries. More specifically, at least one embodiment relates to non-isolated chargers with bi-polar inputs.

2. Discussion of the Related Art

Uninterruptible power supplies (UPS) are used to provide reliable power to many different types of electronic equipment. Often, this electronic equipment requires particular voltage and/or current input from a UPS. Unintended fluctuations in UPS power output can damage electrical equipment, which results in a loss of productivity and can require costly repair or replacement of electrical components.

Figure 1:
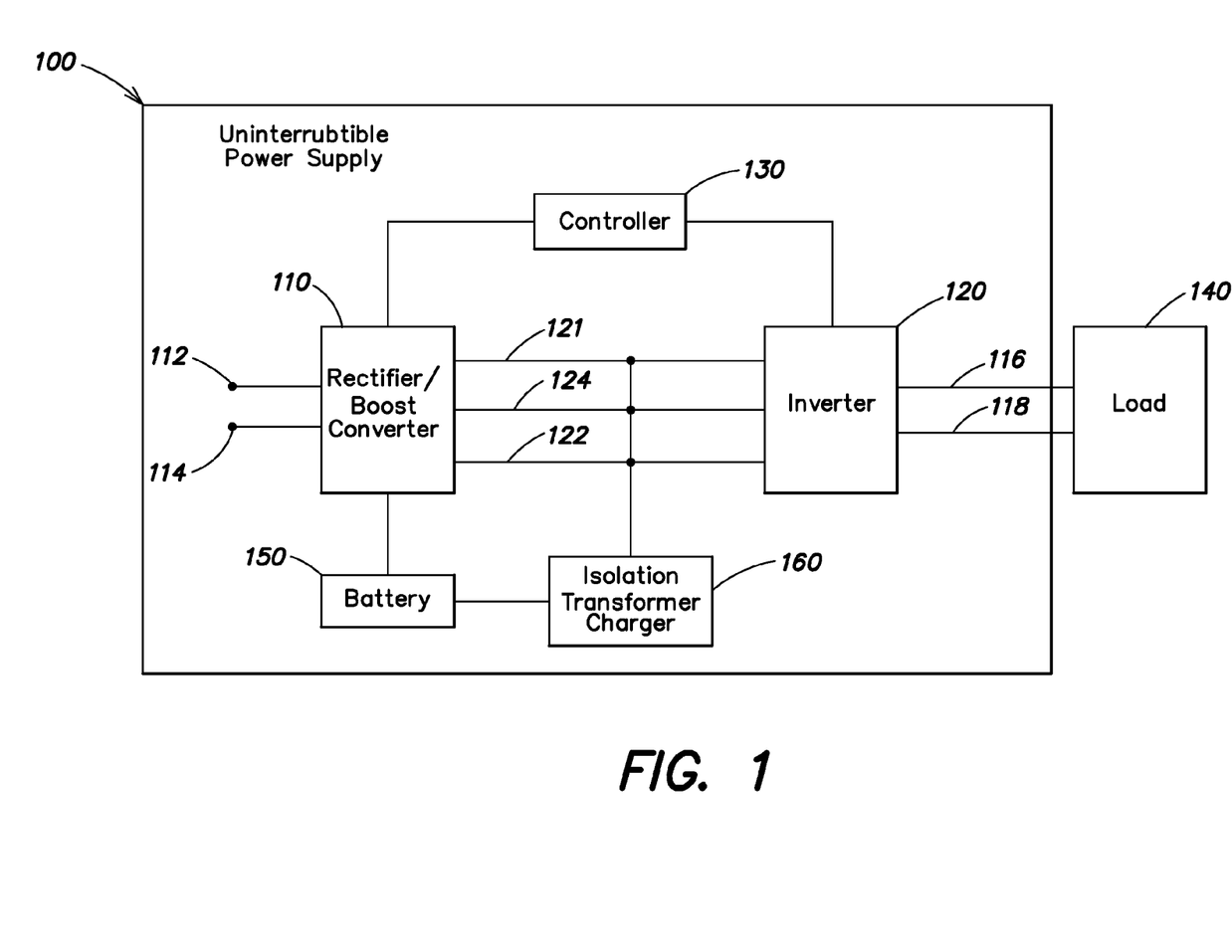
FIG. 1 is a functional block diagram illustrating an uninterruptible power supply in a state of operation.

FIG. 1 provides a block diagram of a typical on-line UPS 100 that provides regulated power as well as back-up power to a load 140. UPS's similar to that shown in FIG. 1 are available from American Power Conversion (APC) Corporation of West Kingston, R.I. The UPS 100 includes a rectifier/boost converter 110, an inverter 120, a controller 130, a battery 150, and an isolation transformer charger 160. The UPS has inputs 112 and 114 to couple respectively to line and neutral of an input AC power source and has outputs 116 and 118 to provide an output line and neutral to the load 140.

In line mode of operation, under control of controller 130, the rectifier 110 receives the input AC voltage and provides positive and negative output DC voltages at output lines 121 and 122 with respect to a common line 124. Isolation transformer charger 160 can be employed to charge battery 150 using an isolation transformer. In battery mode of operation, upon loss of input AC power, the rectifier 110 generates the DC voltages from the battery 150. The common line 124 may be coupled to the input neutral 114 and the output neutral 118 to provide a continuous neutral through the UPS 100. The inverter 120 receives the DC voltages from the rectifier 110 and provides an output AC voltage at lines 116 and 118.

Existing schemes for charging UPS batteries employ an isolated half-bridge topology including a relatively large isolation transformer that is costly, requires a plurality of highly rated associated components, and can saturate due to flux imbalance, causing semiconductor device failure.

SUMMARY OF THE INVENTION

At least one aspect is directed to an uninterruptable power supply having a positive DC bus, a neutral DC bus, and a negative DC bus. The uninterruptible power supply includes a battery charger circuit having an inductor, a first charger output, and a second charger output. A first switch connected to a first end of the inductor is configured to couple the positive DC bus with the first charger output. A second switch connected to a second end of the inductor is configured to couple the negative DC bus with the inductor. The neutral DC bus can be coupled to the second charger output. The battery charger circuit can be configured to draw power from at least one of the positive DC bus and the negative DC bus to charge a battery coupled to the first charger output and the second charger output.

At least one other aspect is directed to a method for charging a battery of an uninterruptable power supply having a positive DC bus, a neutral DC bus, and a negative DC bus. The method couples at least one of a first charger output of a battery charger circuit with the positive DC bus; and an inductor of the battery charger circuit with the negative DC bus. The method couples a second charger output of the battery charger circuit with the neutral DC bus, and applies current from at least one of the positive DC bus and the negative DC bus through the inductor to the battery.

At least one other aspect is directed to an uninterruptable power supply having a positive DC bus, a neutral DC bus, and a negative DC bus. The uninterruptable power supply includes a battery charger circuit having an inductor, a first charger output, and a second charger output. The uninterruptable power supply includes means for selectively coupling the first charger output with the positive DC bus; and the inductor with the negative DC bus. The second charger output can be coupled to the neutral DC bus. The battery charger circuit can be configured to pass current from at least one of the positive DC bus and the neutral DC bus through the inductor to charge a battery.

Various embodiments of these aspects may include a control module configured to switch the first switch and the second switch in unison. A control module can direct the first switch to repeatedly couple and decouple the positive DC to bus with the first charger output during a first time period. The control module can be configured to direct the second switch to repeatedly couple and decouple the negative DC bus with the inductor during a second time period.

In various embodiments, the first switch can be configured to pass current intermittently from the positive DC bus during a first continuous time period, and the second switch can be configured to pass current intermittently from the neutral DC bus during a second continuous time period. The first and second time periods can at least partially overlap. The battery charger circuit can be configured to concurrently receive current from the positive DC bus and from the negative DC bus. In one embodiment, a DC power source can be coupled to at least one of the positive DC bus, the neutral DC bus, and the negative DC bus.

The uninterruptable power supply can include a control module configured to generate an upper current threshold and a lower current threshold, and to control an inductor current of the inductor to a value between the upper current threshold and the lower current threshold. The control module can adjust a first pulse width modulation control signal duty cycle to drive the inductor current below the upper current threshold, and the control module can adjust a second pulse width modulation control signal duty cycle to drive the inductor current above the lower current threshold. In one embodiment, the battery charger circuit can include a transformer and a resistor, and the control module can be configured to sample at least one of a transformer voltage and a resistor voltage to determine a value of the inductor current.

Other aspects and advantages of the systems and methods disclosed herein will become apparent from the following detailed description, taken in conjunction with the accompanying drawings, illustrating the principles of the invention by way of example only.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least one embodiment of the present invention provides improved power distribution to a battery, for example, in the uninterruptible power supply of FIG. 1. However, embodiments of the present invention are not limited for use in uninterruptible power supplies, and may be used with other power supplies or other systems generally.

As shown in the drawings for the purposes of illustration, the invention may be embodied in systems and methods for charging a battery of an uninterruptible power supply battery having a positive DC bus, a neutral DC bus, and a negative DC bus. These systems and methods can selectively couple at least one of a first charger output of the battery charger circuit with a positive DC bus; and an inductor of the battery charger circuit with the negative DC bus. These systems and methods can couple a second charger output of a battery charger circuit with the neutral bus, and can apply power from at least one of the positive and negative buses through the battery charger circuit to the battery. Embodiments of the systems and methods disclosed herein can modulate one or more of a plurality of control signal duty cycles to maintain a battery charger circuit inductor current between an upper threshold value and a lower threshold value.

Figure 2:
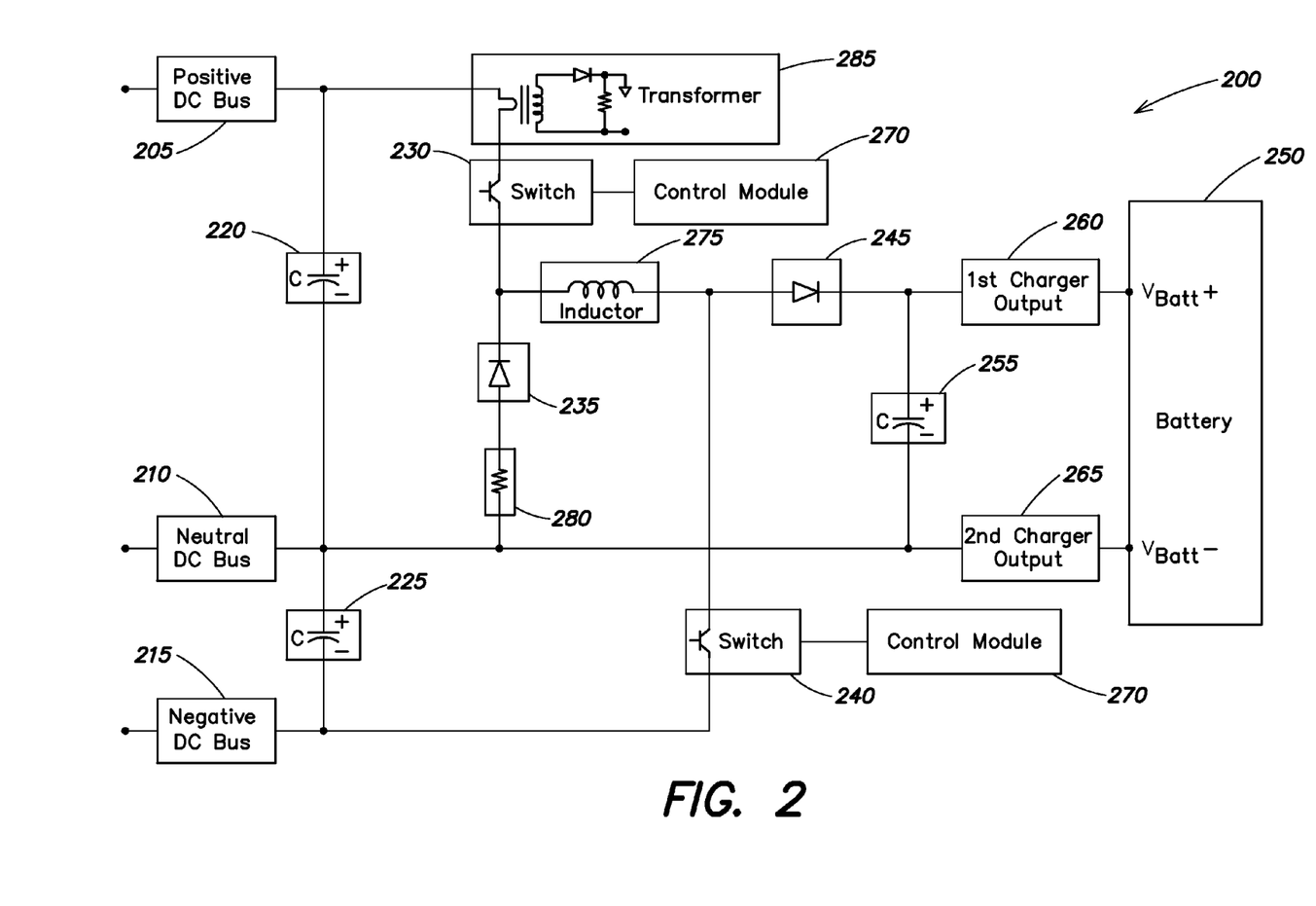
FIG. 2 is a functional block diagram illustrating a battery charger circuit of an uninterruptible power supply in a state of operation.

FIG. 2 is a functional block diagram illustrating a battery charger circuit 200 of an uninterruptible power supply in a state of operation. Battery charger circuit 200 generally includes at least positive DC bus 205, neutral DC bus 210, and negative DC bus 215. These bus lines generally transmit or share power between electrical components. In one embodiment, positive DC bus 205 includes a +400V bus line, neutral DC bus 210 includes a 0V bus line, and negative DC bus 215 includes a −400V bus line. Bus lines 205, 210, and 215 may act as an interface between electrical components. For example, each of positive DC bus 205, neutral DC bus 210, and negative DC bus 215 can couple an uninterruptable power supply (not shown in FIG. 2) with battery charger circuit 200. In one embodiment, battery charger circuit 200 may be included within an uninterruptable power supply. For example, bus lines 205, 210, and 215 may include the positive and negative main lines and the neutral line of an uninterruptable power supply rectifier. In one embodiment, positive DC bus 205, neutral DC bus 210, and negative DC bus 215 can be associated with a power source of an uninterruptable power supply.

In one embodiment, positive DC bus 205 and neutral DC bus 210 connect to opposite sides of at least one first capacitor 220. First capacitor 220 in one embodiment can be associated with a voltage source, such as an uninterruptable power supply rectifier. First capacitor 220 can be associated, directly or via intervening electrical elements, with an input voltage to an uninterruptable power supply. In one embodiment, a positive charge side of first capacitor 220 can connect to positive DC bus 205, and a negative charge side of first capacitor 220 can connect to neutral DC bus 210. In one embodiment, first capacitor 220 can be located between a positive main line and a neutral line of an uninterruptable power supply to rectifier.

Battery charger circuit 200 may also include at least one second capacitor 225, which in one embodiment connects neutral DC bus 210 with negative DC bus 215. For example, second capacitor 225 may be associated with a voltage source. In one embodiment, a positive charge side of second capacitor 225 may connect to neutral bus 210, and a negative charge side of second capacitor 225 may connect to negative bus 215. In one embodiment, second capacitor 220 can be located between a neutral line and a negative main line of an uninterruptable power supply rectifier.

In one embodiment, either or both of first capacitor 220 and second capacitor 225 can be included within an uninterruptable power supply rectifier.

Battery charger circuit 200 may also include at least one first switch 230. First switch 230 generally includes an electrical or mechanical device that can make or break a connection in a circuit. For example, first switch 230 can include at least one transistor. In one embodiment, first switch 230 includes at least one field effect transistor (FET), although other types of transistors (e.g., bi-polar junction, metal oxide semiconductor field effect transistor, etc. may be used). In one embodiment, as illustrated in FIG. 2, diode 235 may be a separate element of battery charger circuit 200. Voltage ratings of the components of battery charger circuit 200 may vary. For example, if capacitor 220 and capacitor 225 are each charged to 400V, and capacitor 255 is charged to 200V, each of capacitors 220 and 225 can have a rating of 450V. In this illustrative embodiment, switch 230 and diode 235 can each have a rating of 600V, switch 240 and diode 245 can have a rating of 800V, and capacitor 255 can have a rating of 250V.

First switch 230 may operate in either of an open state and a closed state, and first switch 230 generally can transition between these two states. An open state generally includes no operative circuit connection across first switch 230, (e.g., an open circuit), and a closed state generally does include an operative circuit connection across first switch 230 (e.g., a closed circuit) so that elements on one side of first switch 230 can be electrically coupled to elements on another side of first switch 230.

In one embodiment, when first switch 230 is closed, current can flow from positive DC bus 205 through battery charger circuit 200. For example, when first switch 230 is in a closed position, battery charger circuit 200 can include a closed to circuit coupling positive DC bus 205 and neutral DC bus 210 so that current may be provided from positive DC bus 205. In another embodiment, when first switch 230 is in an open position, battery charger circuit 200 can include an open circuit so that positive DC bus 205 and neutral DC bus 210 are not coupled. In this embodiment where first switch 230 is open, current is not drawn from positive DC bus 205.

Battery charger circuit 200 may also include at least one second switch 240. Second switch 240 may include at least one transistor. Second switch 240 may operate in either of an open state and a closed state, and can generally transition between these two states. An open state generally includes no operative circuit connection across second switch 240, and a closed state generally does include an operative circuit connection across second switch 240 so that elements on one side of second switch 240 can be electrically coupled to elements on another side of second switch 240.

In one embodiment, when second switch 240 is closed, current can flow from neutral DC bus 210 through battery charger circuit 200. For example, when second switch 240 is in a closed position, battery charger circuit 200 can include a closed circuit coupling neutral DC bus 210 and negative DC bus 215 so that current may be provided from neutral DC bus 210. In another embodiment, when second switch 240 is in an open position, battery charger circuit 200 can include an open circuit so that neutral DC bus 210 and negative DC bus 215 are not coupled. In this embodiment where second switch 240 is open, current is not drawn from negative DC bus 215.

Battery charger circuit 200 may include at least one battery 250, and at least one capacitor 255. In one embodiment, battery 250 can include at least one battery string. In one embodiment, when an uninterruptable power supply including battery charger circuit 200 is in a battery mode of operation, battery 250 can provide power to the uninterruptable power supply. The power output by battery 250 may be applied to, for example, uninterruptable power supply components such as an inverter, or directly to a load associated with the uninterruptable power supply.

In one embodiment, battery 250 can include at least one positive terminal $V_{BATT}^+$ and at least one negative terminal $V_{BATT}^-$. As illustrated in FIG. 2, positive terminal $V_{BATT}^+$ may connect to first charger output 260 and negative terminal $V_{BATT}^-$ may connect to second charger output 265. It should be appreciated that in various to embodiments these connections may be reversed so that first charger output 260 can connect to negative terminal $V_{BATT}^-$ and second charger output 265 can connect to positive terminal $V_{BATT}^+$. In one embodiment, first charger output 260 can couple a terminal, such as positive terminal $V_{BATT}^+$ of battery 250 with positive DC bus 205. In this embodiment, coupling between positive DC bus 205 and battery 250 via first charger output 260 can include various components of battery charger circuit 200, such as first switch 230, diode 245, and other components described herein as illustrated, for example, in FIG. 2. In one embodiment, second charger output 265 can couple a terminal, such as negative terminal $V_{BATT}^-$ of battery 250 with neutral bus line 210. It should be appreciated that the embodiment illustrated in FIG. 2 may be reversed so that second charger output 265 couples with positive terminal $V_{BATT}^+$ of battery 250, and negative terminal $V_{BATT}^-$ of battery 250 couples with first charger output 260.

In one embodiment, battery charger circuit 200 can include at least one control module 270. Control module 270 generally controls the switching of, for example, any of first switch 230 and second switch 240. Control module 270 can sense current in battery charger circuit 200 such as current through inductor 275. Control module 270 may include at least one processor or circuit configured to perform logic operations that, for example, control the switching of first switch 230 or second switch 240 between open and closed states. In one embodiment, control module 270 is the main controller of an uninterruptable power supply containing the charging circuit. In one embodiment, control module 270 may include at least one control signal generator to generate, for example, a pulse with modulation control signal having a duty cycle that can be applied to first switch 230 or second switch 240 to control switching operations. In one embodiment, a pulse width modulation control signal having a first duty cycle can be applied to first switch 230 and a pulse with modulation control signal having a second duty cycle can be applied to second switch 240. In this embodiment, the first duty cycle (applied to first switch 230) and the second duty cycle (applied to second switch 240) can be different duty cycles.

Battery charger circuit 200 may include at least one inductor 275, which may have, for example, an inductance tolerance of less than 15%, although other tolerances are possible. In one embodiment, a first end of inductor 275 can be to connected to first switch 230, and a second end of inductor 275 can be connected to second switch 240. In this illustrative embodiment, current through inductor 275 may be provided from positive DC bus 205 and neutral DC bus 210, depending on the state of first switch 230 and second switch 240. For example, when first switch 230 is closed, (i.e., forming a connection) current through inductor 275 can be provided in a path from positive DC bus 205 to neutral DC bus 210. Continuing with this illustrative embodiment, when second switch 240 is closed, current through inductor 275 can be provided in a path from neutral DC bus 210 to negative DC bus 215. In one embodiment, first switch 230 and second switch 240 can be closed simultaneously. In this embodiment, current through inductor 275 can concurrently be provided from both positive DC bus 205 and neutral DC bus 210. In one embodiment, current from at least one of positive DC bus 205 and negative DC bus 215 may pass through inductor 275 and along first charger output 260 to charge battery 250. In this illustrative embodiment, second charger output 265 may be coupled with neutral DC bus 210.

In one embodiment, first switch 230 and second switch 240 may switch alternately, so that when one switch is open, the other is generally closed. For example, in an embodiment where inductor 275 charges or discharges at 100 kHz, first switch 230 and second switch 240 may switch at 50 kHz. In this example, dissipation in first switch 230 and second switch 240 can occur at half of the inductor frequency of inductor 275.

In another embodiment, first switch 230 and second switch 240 may switch in unison, so that both switches are in a same state at a same time. For example, first switch 230 and second switch 240 may both be open for all or part of a same time period. In another example, first switch 230 and second switch 240 may both be closed for all or part of a same time period. In an example of this illustrative embodiment where first switch 230 and second switch 240 operate synchronously, each of first switch 230, second switch 240, and inductor 275 can operate at a same frequency, such as 100 kHz, for example. In various embodiments, these components may operate at frequencies that vary, for example, from 20 kHz to 150 kHz.

In one embodiment, first switch 230 can repeatedly switch states (e.g., from open to closed) while second switch 240 remains in a same state, (e.g., open). In an to embodiment where first switch 230 repeatedly switches from an open position to a closed position over a period of time while second switch 240 remains open, current can be provided to inductor 275 from positive DC bus 205. This time period may be, for example 10 ms, although other time periods are possible. In one embodiment where first switch 230 cycles between states while second switch 240 remains open, current can be provided to inductor 275 from only positive DC bus 205. It should be appreciated that in other embodiments a current path can be provided to inductor 275 from either or both of positive DC bus 205 and neutral DC bus 210 at either the same or different times.

Continuing with an illustrative embodiment where first switch 230 switches between states while second switch 240 remains open, in one embodiment, after a time period the operations of first switch 230 and second switch 240 can reverse, i.e., first switch 230 remains in one state (e.g., open) while second switch 240 repeatedly switches states over a time period, (i.e., repeatedly opens and closes). In this embodiment, for example, current may be provided to inductor 275 from neutral DC bus 210 while second switch 240 is cycling and first switch 230 remains open. In various embodiments, these cycling operations may continue, where one switch repeatedly switches states between open and closed while another switch remains in a single state, which in various embodiments can be either an open state or a closed state. For example, second switch 240 may oscillate between open and closed states with first switch 230 in an open state for a first time period of 10 ms. After the first time period, second switch 240 may remain in a single state (e.g., open) while first switch 230 oscillates between open and closed states for a second time period, which may but need not also be 10 ms.

In various embodiments, where for example switches operate in unison, alternately, or in cycles where one switch changes states while the other does not, elements of battery charger circuit 200 such as inductor 275 can be provided current from at least one of positive DC bus 205 and neutral DC bus 210. This may occur alternately or concurrently, or during consecutive, overlapping, or partially overlapping time periods, for example.

In one embodiment, control module 270 can sense a current of inductor 275. For example, control module 270 may sample, sense, or otherwise receive or obtain to an indication of a voltage of at least one of resistor 280 or transformer 285. In one embodiment, control module 270 can obtain a secondary voltage of current transformer 285, which may include, for example, a transformer having a 1:100 turn ratio with a tolerance of less than 5%. In one embodiment, voltages of resistor 280 and transformer 285 can be summed to provide inductor current feedback to controller 270. Controller 270 may then use inductor current feedback based on voltage measurements of at least one of resistor 280 and transformer 285 to control the current of inductor 275 to regulate battery 250 voltage or current.

In one embodiment, control module 270 employs hysteretic control that generally controls the current of inductor 275 so that, for example, inductor current may remain within a range, which can be defined by an upper threshold and a lower threshold. For example, battery charger circuit 200 may include current sense transformer 285 and current sense resistor 280 that can sense the inductor current. This sensed inductor current may be evaluated against the upper and lower threshold to determine if the inductor current is within the range. Continuing with this illustrative embodiment, when information from transformer 285 or resistor 280 indicates that inductor current is approaching or below a minimum threshold, control module 270 can close at least one of first switch 230 and second switch 240, creating a path for current to flow to inductor 275 from at least one of positive bus 205 and neutral bus 210. In one embodiment, when information from one or more of resistor 280 and transformer 285 indicates that inductor current is too high, (e.g., approaching or exceeding a maximum threshold) control module 270 may open, for example, first switch 230, which interrupts current flow from positive bus 205 to inductor 275, lowering inductor current. In one embodiment, control module 270 may control inductor current based on information related to a voltage of battery 250. For example, in various embodiments if battery 250 voltage is either above or below a threshold, control module 270 may either open or close one of first switch 230 and second switch 240 to either provide or remove a path for current to flow through inductor 275. In one embodiment, the upper and lower thresholds can vary based on the voltage of battery 250.

Control module 270 may employ pulse width modulation (PWM) techniques that do not include fixed frequency control. However, in one embodiment, fixed to frequency control can be used where, for example, switches 230 and 240 do not alternate every switch cycle. For example, control module 270 may include at least one control signal generator to produce one PWM control signal for each of first switch 230 and second switch 240. A different duty cycles may be associated with each PWM control signal controlled by control module 270. Control module 270 may adjust a duty cycle of a PWM control signal to, for example, switch a state of at least one of first switch 230 and second switch 240 to increase or decrease current flow through inductor 275.

In one embodiment, control module 270 may apply a duty cycle to first switch 230 and apply a different duty cycle to second switch 240. In one embodiment, the collective application of various duty cycles from control module 270 to at least one of first switch 230 and second switch 240 maintains inductor current at a level between an upper current threshold and a lower current threshold. In one embodiment, upper and lower thresholds used to control a duty cycle associated with first switch 230 can be different from upper and lower thresholds used to control a duty cycle associated with second switch 240. In one embodiment, control module 270 can adjust a PWM control signal duty cycle to control the inductor current between upper and lower thresholds. For example, first switch 230 may switch from a closed position to an open position to cut off the flow of current from positive DC bus 205 through inductor 275, which can decrease the inductor current. In one embodiment, second switch 240 can switch from an open position to a closed position to enable the flow of current from negative DC bus 215 through inductor 275 to increase.

It should be appreciated that in various embodiments control module 270 can control the state of switches such as either or both of first switch 230 and second switch 240 using hysteretic control. This can regulate the current flow from any of positive DC bus 205, neutral DC bus 210, and negative DC bus 215. This current may flow through inductor 275 and may be applied to battery 250 via at least one of first charger output 260 and second charger output 265. Applying current to battery 250 generally charges battery 250.

It should be further appreciated that either or both of first switch 230 and second switch 240 may be opened or closed to regulate, for example the current flow to from any of positive DC bus 205, neutral DC bus 210, and negative DC bus 215, the current or voltage of inductor 275, and the current or voltage applied to battery 250. The nomenclature of identifying first and second elements of battery charger circuit 200 is not intended to be limiting. For example, first and second elements such as first switch 230 and second switch 240, or first charger output 260 and second charger output 265 can be equivalent or interchangeable elements.

Figure 3:
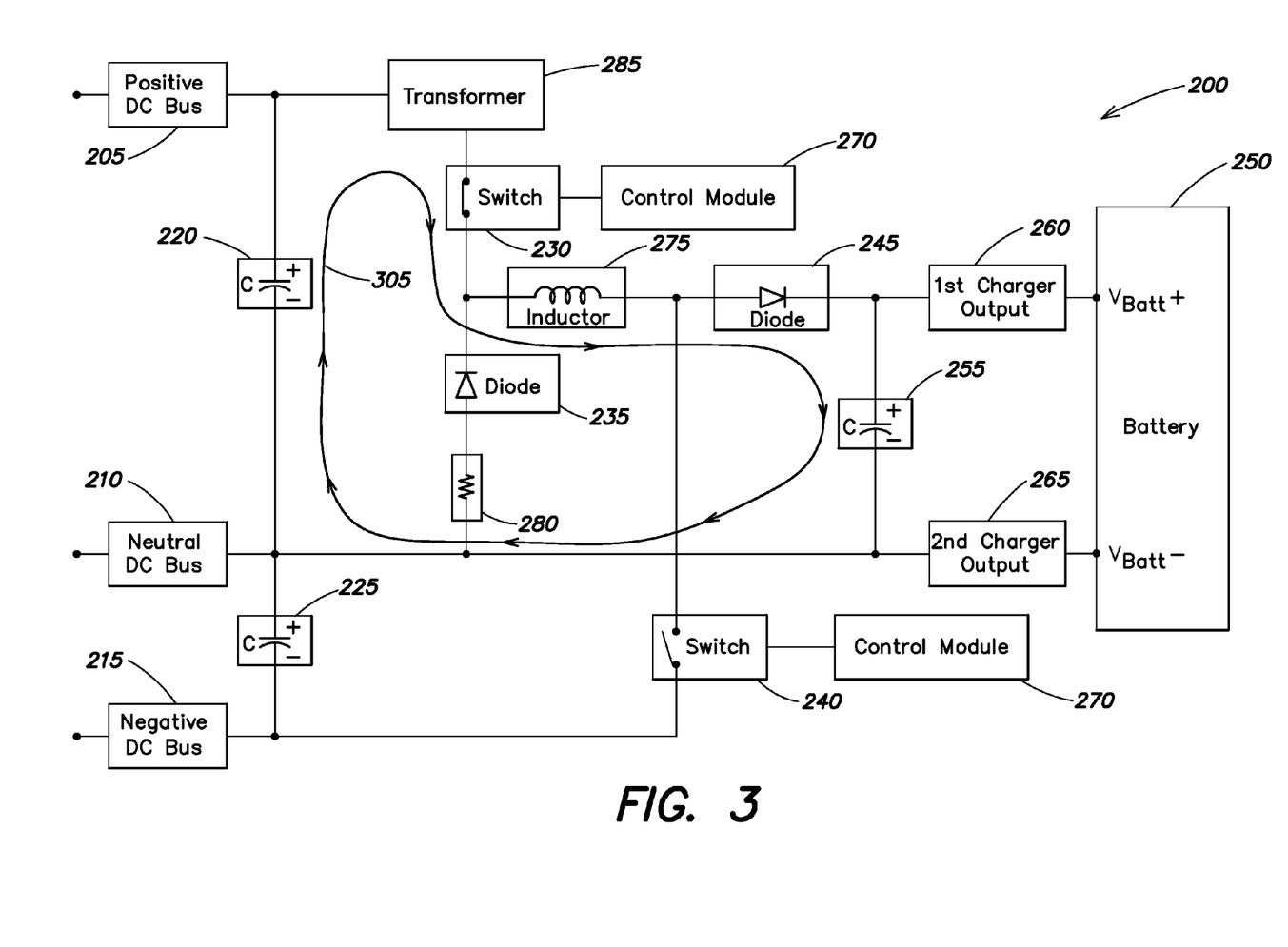
FIG. 3 is a functional block diagram illustrating a battery charger circuit of an uninterruptible power supply in a state of operation.

FIG. 3 is a functional block diagram illustrating battery charger circuit 200 of an uninterruptible power supply in a state of operation. In the embodiment illustrated in FIG. 3, first switch 230 is in a closed position and second switch 240 is in an open position. In this illustrative embodiment, closed first switch 230 completes a circuit between positive DC bus 205 and battery 250. As shown in FIG. 3, inductor 275 can be provided current from positive DC bus 205 that can be applied to battery 250 via first charger output 260. It should be appreciated that providing current from any of positive DC bus 205, neutral DC bus 210, or negative DC bus 215 can include providing current from a power source coupled to any of these bus lines. As shown in FIG. 3, switch 240 is open and inductor 275 in this example is not drawing current from negative DC bus 215.

As illustrated in FIG. 3, first switch 230 is connected to a first end of inductor 275. Current can pass through closed first switch 230, through inductor 275 and to battery 250 via first charger output 260. In one embodiment, inductor 275 can be charged when current flows through it from, for example, one of the DC bus lines. In this embodiment inductor current may increase with time. In another embodiment, inductor 275 can discharge when current drains from inductor 275 to battery 250, and in this embodiment inductor current may decrease with time. FIG. 3 illustrates current loop 305, which generally depicts current travelling through battery charger circuit 200 in the embodiment of FIG. 3, where first switch 230 is closed and second switch 240 is open. As illustrated, it can be seen that battery charger circuit 200 may draw current from a voltage source connected to positive DC bus 205 and neutral DC bus 210 through first switch 230 and inductor 275, and apply the current to battery 250. For example, control module 270 can close first switch 230 to draw current from positive DC bus 205, increasing current through inductor 275 to charge battery 250. In one embodiment where first switch 230 is closed while second switch 240 is open, to it should be appreciated that about half of the voltage of battery charger circuit 200, (200V in one example) may be applied to inductor 275 with, for example, another 200V applied across battery 250 or capacitor 255.

Figure 4:
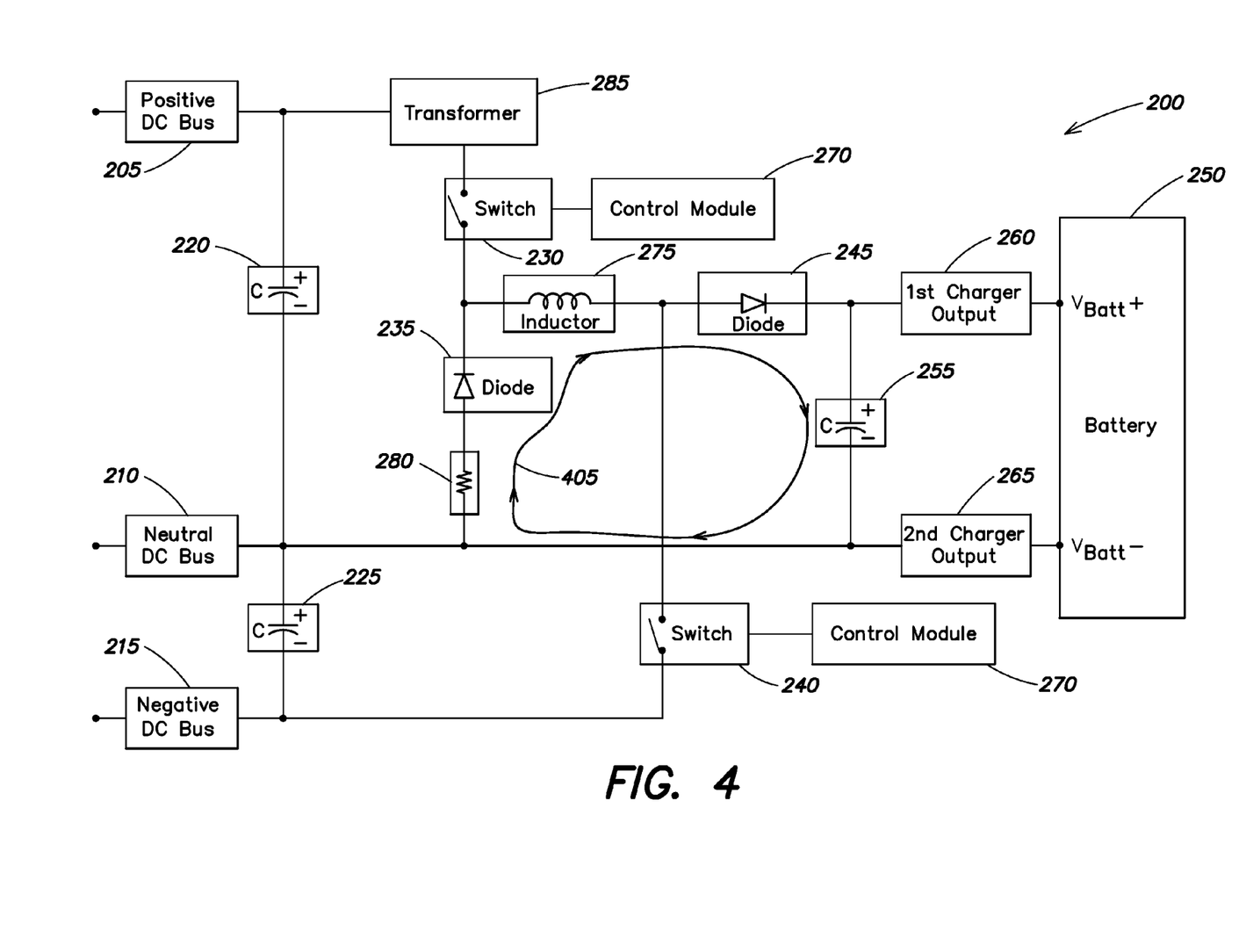
FIG. 4 is a functional block diagram illustrating a battery charger circuit of an uninterruptible power supply in a state of operation.

FIG. 4 is a functional block diagram illustrating battery charger circuit 200 of an uninterruptible power supply in a state of operation. In the embodiment of FIG. 4, both first switch 230 and second switch 240 are open. In this example both positive DC bus 205 and negative DC bus 215 are electrically cut off from inductor 275.

In one embodiment, current from at least one of positive DC bus 205 and neutral DC bus 210 may circulate through current loop 405 through inductor 275 and across capacitor 255. For example, the state of operation of battery charger circuit 200 may change with time. If a state of operation prior to the state of operation depicted in FIG. 4 included an embodiment where first switch 230 was closed, current may have been provided from positive DC bus 205; if second switch 240 was closed, current may have been provided from neutral DC bus 210; and if both first switch 230 and second switch 240 were closed, current may have been provided from both positive DC bus 205 and neutral DC bus 210. Continuing with this example, when any of these states change to the state of operation illustrated in FIG. 4, current present in current loop 405 may pass through inductor 275 and first charger output 260 to charge battery 250.

In one embodiment, control module 270 may open both first switch 230 and second switch 240 because, for example, inductor current is approaching or exceeding an upper threshold value. In another embodiment, first switch 230 and second switch 240 may be open at the same time to avoid overloading, for example, battery 250, resistor 280, transformer 285, other elements of battery charger circuit 200, an uninterruptable power supply, or its load.

Figure 5:
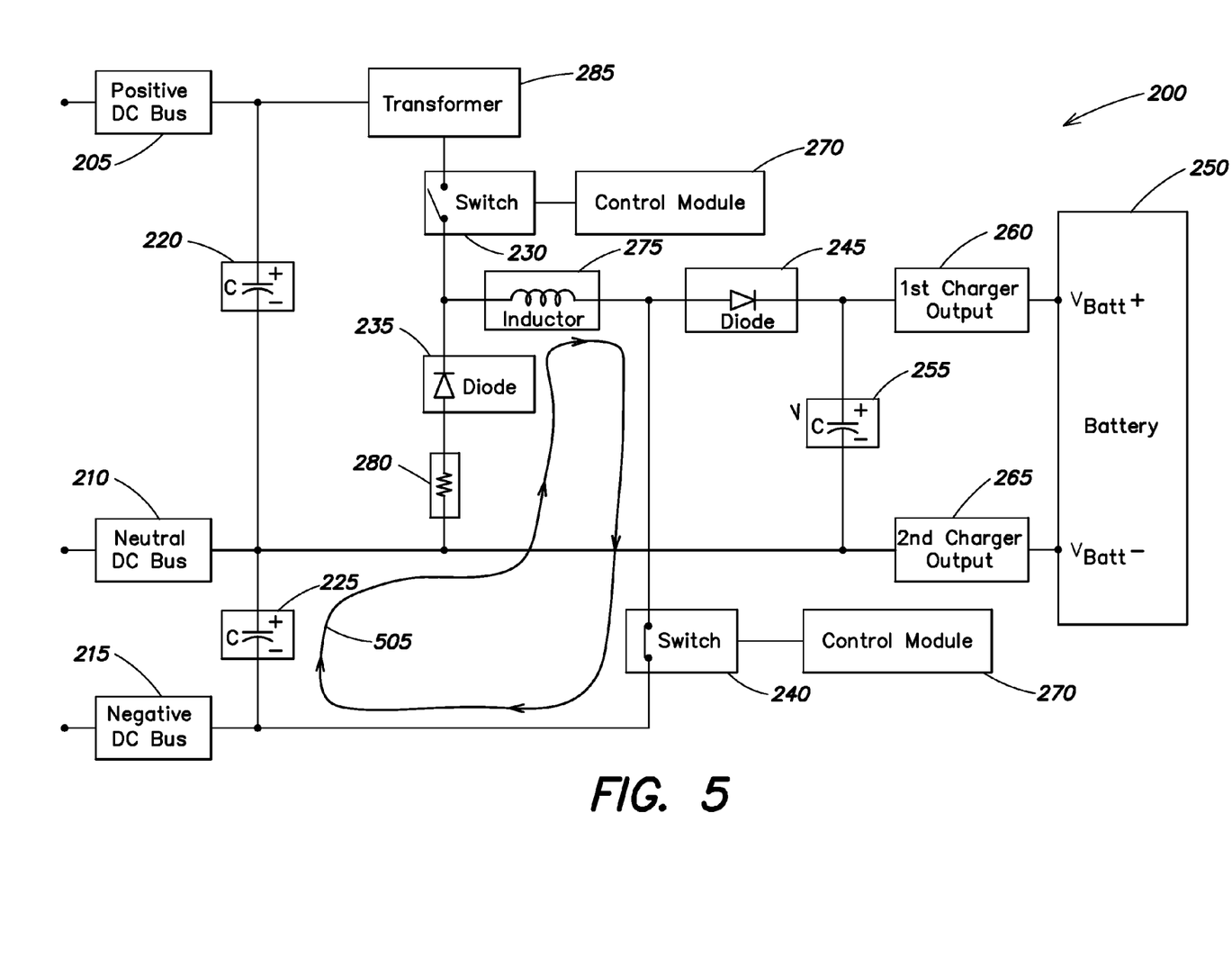
FIG. 5 is a functional block diagram illustrating a battery charger circuit of an uninterruptible power supply in a state of operation.

FIG. 5 is a functional block diagram illustrating battery charger 200 circuit of an uninterruptible power supply in a state of operation. In the embodiment of FIG. 5, first switch 230 is open and second switch 240 is closed. In embodiments where second switch 240 is in a closed position, such as the embodiment illustrated in FIG. 5, inductor 275 can receive current from neutral DC bus 210 through inductor 275. This may be done, for example, to maintain inductor current at a level that is to between an upper threshold and a lower threshold. In one embodiment, control module 270 may close second switch 240 to increase inductor current flowing through inductor 275 in the path generally indicated by current loop 505. Continuing with this illustrative embodiment, should second switch 240 transition to an open state, inductor current may then be applied to battery 250 via current loop 405, as depicted in FIG. 4. In one embodiment where second switch 240 is closed while first switch 230 is open, it should be appreciated that all or substantially all of the voltage of battery charger circuit 200, (400V in one example) may be applied to inductor 275.

By leaving first switch 230 in an open position and repeatedly toggling second switch 240 between the closed position of FIG. 5 and the open position of FIG. 4, the inductor current is alternately increasing (as current is provided from neutral DC bus 210) and decreasing (as current is drained to battery 250). It can be seen that in this embodiment, battery charger circuit 200 operates to charge battery 250 by repeatedly changing states of operation between those of FIGS. 4 and 5. It should also be appreciated that repeatedly changing states of operation between those of FIGS. 3 and 4 results in an increase in inductor current (as current is provided from positive DC bus 205) and a decrease in inductor current (as current is drained to battery 250).

Figure 6:
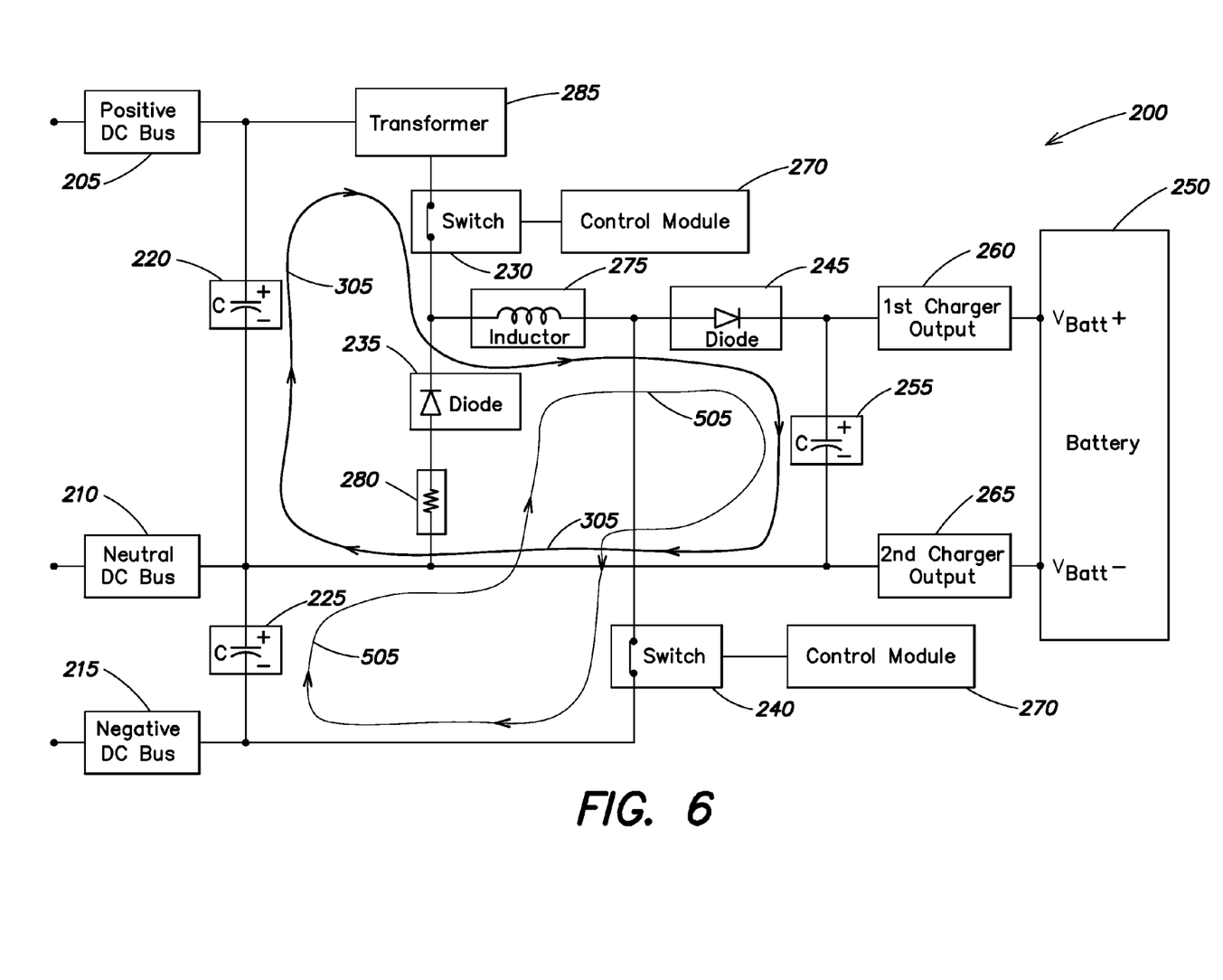
FIG. 6 is a functional block diagram illustrating a battery charger circuit of an uninterruptible power supply in a state of operation.

FIG. 6 is a functional block diagram illustrating battery charger circuit 200 of an uninterruptible power supply in a state of operation. In one embodiment of FIG. 6, both first switch 230 and second switch 240 are closed. As illustrated in FIG. 6, closed switches 230 and 240 enable inductor 275 to charge from both positive DC bus 205 (due to closed first switch 230) and from neutral DC bus 210 (due to closed second switch 240). As illustrated in FIG. 6, current loop 305 can charge inductor 275 from positive DC bus 205 and apply at least some of this power to battery 250 via first input line 260. Also as illustrated in FIG. 6, current loop 505 can charge inductor 275, and this charge may then drain into battery 250 via current loop 305, for example.

In one embodiment, at least one of first switch 230 and second switch 240 being in a closed condition can cause an increase in inductor current. For example, control module 270 may close one or both of first and second switches 230 and 240 to drive inductor current above a threshold. Continuing with this example, to reduce a to rate of inductor current increase, or to decrease inductor current, control module 270 may open one or both of first switch 230 and second switch 240, (as illustrated in FIGS. 3-5).

The embodiments illustrated in any of FIGS. 2-6 each depict battery charger circuit 200 operation for at least one time instant. In various embodiments, the operating state of battery charger circuit 200 can change with time. For example, first switch 230 and second switch 240 may be switching between open and closed states with time and in a variety of patterns, which may overlap. In various embodiments, either or both of first switch 230 and second switch 240 may be open, closed, transitioning from opened to closed, or transitioning from closed to open, for example.

It should be appreciated that in various embodiments modified configurations of battery charger circuit 200 are possible. For example, any of positive DC bus 205, neutral DC bus 210, and negative DC bus 215 can couple with any terminal of battery 250 via any of first charger output 260, second charger output 265, and intervening circuit components, such as those illustrated in the Figures, or other components or topologies. Battery charger circuit 200 can be compatible with any topology where, for example, positive and negative DC buses used as inputs to charge a battery where one terminal of the battery is connected to a midpoint or neutral line of the positive and negative DC buses. This may include, for example, a double conversion uninterruptable power supply.

Figure 7:
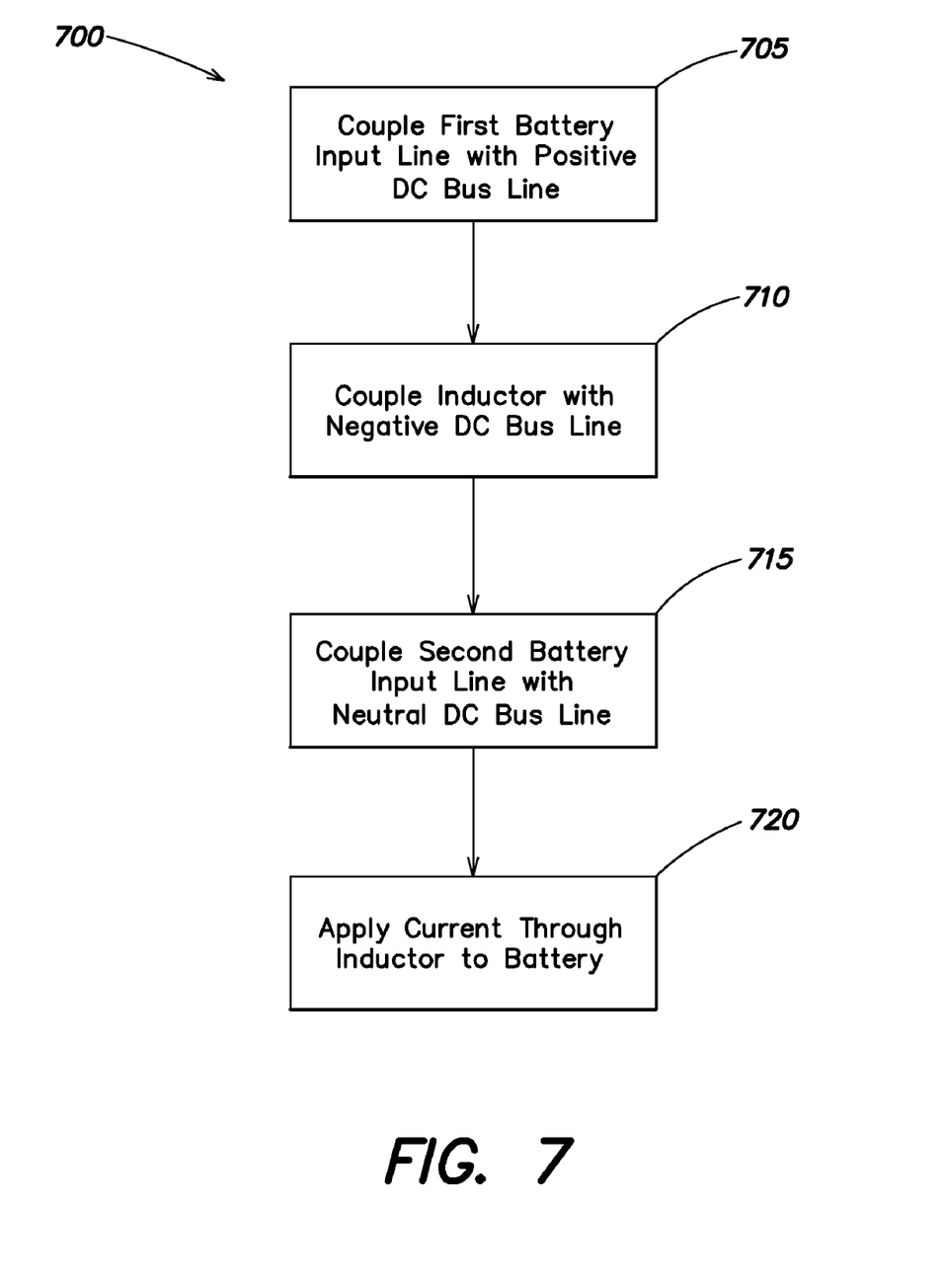
FIG. 7 is a flow chart illustrating a method for charging a battery of an uninterruptable power supply in a state of operation.

FIG. 7 is a flow chart illustrating a method 700 for charging a battery of an uninterruptable power supply in a state of operation. In one embodiment, the uninterruptable power supply includes a positive DC bus, a neutral DC bus, and a negative DC bus. Method 700 may include the act of coupling a first charger output of a battery charger circuit with the positive DC bus (ACT 705). Coupling the first charger output with the positive DC bus (ACT 705) may include connecting positive DC bus associated with a source voltage to a battery via a charger output connected to a battery terminal. In one embodiment positive DC bus coupling act (ACT 705) can include connecting the first charger output with the positive DC bus via one or more intervening elements of a battery charger circuit, such as one or more transformers, diodes, inductors, or switches, for example.

In one embodiment, coupling the first charger output with the positive DC bus (ACT 705) can include performing a first switching operation at a first end of an inductor of a battery charger circuit. For example a switching operation may close a switch to complete an electrical connection that couples, for example, a DC bus with a battery input line (ACT 705). In one embodiment, this first switching operation may be performed more than once during a time period to repeatedly couple and decouple a DC bus with a battery input line. In various embodiments, coupling the positive DC bus with a first charger output (ACT 705) allows an inductor of a battery charger circuit to be charged from the positive DC bus, and to supply power to a battery associated with the battery charger circuit.

Method 700 may also include the act of coupling at least one inductor of a battery charger circuit with a negative DC bus (ACT 710). In various embodiments, inductor coupling act (ACT 710) can include connecting an inductor of the battery charger circuit with a negative DC bus either directly or via intervening elements of a battery charger circuit, such as a switch for example. Method 700 in various embodiments may perform any of positive DC bus coupling (ACT 705), negative DC bus coupling (ACT 710), or both positive DC bus coupling (ACT 705) and negative DC bus coupling (ACT 710).

In one embodiment, coupling a DC bus with an inductor (ACT 710) can include performing a second switching operation at a second end of the inductor. For example, a switching operation may close a switch to complete an electrical connection that couples, for example, a DC bus with the inductor (ACT 710). In one embodiment, this second switching operation may be performed more than once during a time period to repeatedly couple and decouple a negative DC bus with the inductor. In various embodiments, coupling the negative DC bus with the inductor (ACT 710) allows the inductor to be charged from the neutral DC bus, and this charge may then be supplied to charge a battery associated with the battery charger circuit.

In one embodiment, method 700 can perform the act of coupling a second charger output of a battery charger circuit with a neutral DC bus (ACT 715). For example, a battery terminal may connect to or otherwise interface with a charger output of a battery charger circuit, and the charger output may connect to a neutral DC bus associated with a power source. In various embodiments, neutral DC bus may to form a closed circuit with the inductor and at least one of positive DC bus and negative DC bus.

Generally, any coupling act described herein, such as positive DC bus coupling act (ACT 705), negative DC bus coupling act (ACT 710), or neutral DC bus coupling act (ACT 715) may include electrically connecting at least two elements directly or via one or more intervening elements, such as various circuit components. Method 700 in one embodiment can include the three coupling acts described above, (ACT 705, ACT 710, and ACT 715) which couple, respectively, a positive DC bus, a negative DC bus, and a neutral DC bus with a battery charger circuit that can include two charger outputs to a battery, for example a first charger output that connects to a first battery terminal, and a second charger output that connects to a second battery terminal.

It should be appreciated that method 700 can include an embodiment where a voltage source having three outputs, (e.g., positive, negative, and neutral) charges a battery having two terminals, (e.g., positive and negative). In this example, at least one battery terminal can couple with or otherwise connect to the neutral output of the voltage source (i.e., a neutral DC bus) and the other battery terminal can couple with either the positive output of the voltage source or the negative output of the voltage source (i.e., positive DC bus or negative DC bus).

In one embodiment, method 700 can perform the act of applying current through an inductor of a battery charger circuit to a battery (ACT 720). In one embodiment, applying current (ACT 720) can include applying current from at least one of a positive DC bus and a neutral DC bus through the inductor to the battery. For example, at least one of first and second switching operations can control inductor current in a path from at least one of positive DC bus and neutral DC bus through the inductor to charge a battery (ACT 720). Method 700 generally includes control of first and second switching operations to regulate current drawn from, for example, the positive DC bus or the negative DC bus as a result of at least one of positive DC bus coupling act (ACT 705), negative DC bus coupling act (710), and neutral DC bus coupling act (ACT 715). Generally, controlling first and second switching operations controls inductor current by regulating the amount of current drawn to or drained from the inductor.

In one embodiment, the elements or acts of FIGS. 1-7 include the elements of uninterruptable power supply 100. For example in various embodiments control module 270 includes controller 130, and battery 250 includes battery 150, for example. It is further evident that in one embodiment battery charger circuit 200 can include elements not shown that correspond to elements of FIG. 1, such as multiple input, output, or neutral lines, for example.

Note that in FIGS. 1 through 7, the enumerated items are shown as individual elements. In actual implementations of the systems and methods described herein, however, they may be inseparable components of other electronic devices such as a digital computer. Thus, at least some of the elements and acts described above may be implemented at least in part in software that may be embodied at least in part in an article of manufacture that includes a program storage medium. The program storage medium can include one or more of a carrier wave, a computer disk (magnetic, or optical (e.g., CD or DVD, or both), non-volatile memory, tape, a system memory, and a computer hard drive.

From the foregoing, it is appreciated that the systems and methods described herein afford a simple and effective way to charge a battery of an uninterruptable power supply. The systems and methods according to various embodiments are able to charge a battery by connecting one terminal of the battery to a neutral bus line of a voltage source and to connect the positive and negative bus lines of the DC source to circuit elements to charge the battery. This eliminates the need for isolated half bridge topologies including isolation transformers and associated components, which increases efficiency and reliability while reducing size and lowering cost.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment", "some embodiments", "an alternate embodiment", "various embodiments", "one embodiment", or the like are not to necessarily mutually exclusive. Any embodiment may be combined with any other embodiment in any manner consistent with the objects, aims, and needs disclosed herein.

Where technical features mentioned in any claim are followed by references signs, the reference signs have been included for the sole purpose of increasing the intelligibility of the claims and accordingly, neither the reference signs nor their absence have any limiting effect on the scope of any claim elements.

One skilled in the art will realize the systems and methods described herein may be embodied in other specific forms without departing from the spirit or essential characteristics thereof. For example, embodiments of the present invention are not limited to the uninterruptable power supplies, and may be used with other power supplies, converters, frequency converters, line conditioners, or other systems generally. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. An uninterruptable power supply, comprising:
a positive DC bus, a neutral DC bus, and a negative DC bus;
a battery charger circuit having an inductor, a first charger output and a second charger output;
a first switch having a first end coupled to a first end of the inductor, the first switch configured to selectively couple the positive DC bus with the first charger output; and
a second switch having a first end coupled to a second end of the inductor, the second switch configured to selectively couple the negative DC bus with the inductor;
wherein the inductor is a single inductor configured between the first end of the first switch and the first end of the second switch;
wherein the neutral DC bus is coupled to the second charger output; and
wherein the battery charger circuit is configured to draw power from at least one of the positive DC bus and the negative DC bus to charge a battery coupled to the first charger output and the second charger output.

2. The uninterruptable power supply of claim 1, comprising:
a control module configured to switch the first switch and the second switch in unison.

3. The uninterruptable power supply of claim 1, wherein the battery charger circuit is configured to concurrently receive current from the positive DC bus and from the negative DC bus.

4. The uninterruptable power supply of claim 1, further comprising:
a control module configured to drive an inductor current of the inductor toward a value between an upper current threshold and a lower current threshold.

5. The uninterruptable power supply of claim 4, wherein:
the battery charger circuit includes a current transformer and a resistor; and
the control module is configured to sample at least one of a transformer voltage and a resistor voltage to determine a value of the inductor current.

6. A method for charging a battery of an uninterruptable power supply having a positive DC bus, a neutral DC bus, and a negative DC bus, comprising:
selectively coupling:
a first charger output of a battery charger circuit with the positive DC bus by use of a first switch; and
a single inductor of the battery charger circuit with the negative DC bus by use of a second switch to couple the inductor between a first end of the first switch and a first end of the second switch;
coupling a second charger output of the battery charger circuit with the neutral DC bus; and
applying current from at least one of the positive DC bus and the neutral DC bus through the inductor to the battery.

7. The method of claim 6, comprising:
performing a first switching operation on the first switch at a first end of the inductor to couple the positive DC bus with the first battery output; and
performing a second switching operation on the second switch at a second end of the inductor to couple the inductor with the negative DC bus.

8. The method of claim 6, comprising:
drawing a substantially equal amount of power from each of the positive DC bus and the negative DC bus through the battery charger circuit to charge the battery.

9. An uninterruptable power supply, comprising:
a positive DC bus, a neutral DC bus, and a negative DC bus;
a battery charger circuit having a single inductor, a first charger output, and a second charger output;
means for selectively controlling:

a first switch coupled to a first end of the inductor to couple the first charger output with the positive DC bus; and a second switch coupled to a second end of the inductor to couple the inductor with the negative DC bus;

the second charger output coupled to the neutral DC bus; and the battery charger circuit configured to pass current from at least one of the positive DC bus and the neutral DC bus through the inductor to charge a battery.

10. The uninterruptable power supply of claim 1, comprising:

the first charger output consisting essentially of a direct connection with a first capacitor, a diode, and the battery; and the second charger output consisting essentially of a direct connection with the first capacitor, a resistor, a second capacitor, the neutral DC bus, and the battery.

11. The uninterruptable power supply of claim 1, wherein the battery charger circuit is an only battery charger circuit configured to draw power from at least one of the positive DC bus and the negative DC bus to charge the battery.

12. The uninterruptable power supply of claim 1, further comprising the battery charger circuit consisting essentially of a single battery charger circuit.

13. The uninterruptable power supply of claim 1, comprising:

the battery charger circuit configured with bi-polar inputs to receive input voltage from a power source.

14. The uninterruptable power supply of claim 1, wherein inductance of the battery charger circuit between the first end of the first switch and the first end of the second switch consists essentially of inductance associated with the inductor during operation of the uninterruptable power supply.

15. The uninterruptable power supply of claim 1, comprising:

the first end of the first switch directly connected to the first end of the inductor; and the first end of the second switch directly connected to the second end of the inductor.

16. The uninterruptable power supply of claim 1, wherein the second switch is connected to the second end of the inductor and configured to create a current path through the second switch and the inductor, the current path bypassing the first charger output and the second charger output.

17. The method of claim 6, comprising:

controlling the first switch to couple the first charger output with the positive DC bus; and controlling the second switch to couple the inductor with the negative DC bus.

18. The method of claim 6, comprising:

directly connecting the first end of the first switch to the first end of the inductor; and directly connecting the first end of the second switch to the second end of the inductor.

19. The method of claim 6, comprising:

connecting the second switch to the second end of the inductor to create a current path through the second switch and the inductor, the current path bypassing the first charger output and the second charger output.

20. The uninterruptable power supply of claim 9, wherein the second switch is configured to create a current path through the second switch and the inductor, the current path bypassing the first charger output and the second charger output.

* * * * *

UNITED STATES PATENT AND TRADEMARK OFFICE
CERTIFICATE OF CORRECTION

| | | |
|---|---|---|
| PATENT NO. | : 7,834,587 B1 | Page 1 of 1 |
| APPLICATION NO. | : 12/797987 | |
| DATED | : November 16, 2010 | |
| INVENTOR(S) | : Jeffrey B. Samstad | |

It is certified that error appears in the above-identified patent and that said Letters Patent is hereby corrected as shown below:

In the Specification:

At column 1, line number 52, after the word "flux" delete "to";

At column 4, line number 33, after the word "supply" delete "to";

At column 5, line number 11, after the word "closed" delete "to";
  line number 54, after the word "various" delete "to";

At column 6, line number 30, after the word "be" delete "to";

At column 7, line number 7, after the word "an" delete "to";
  line number 50, after the word "obtain" delete "to";

At column 8, line number 28, after the word "fixed" delete "to";

At column 9, line number 3, after the word "flow" delete "to";
  line number 47, after the word "open" delete "to";

At column 10, line number 23, after the word "is" delete "to";
  line number 66, after the word "a" delete "to"; and At column 12, line number 18, after the word "may" delete "to".

Signed and Sealed this
Twenty-second Day of November, 2011

David J. Kappos
*Director of the United States Patent and Trademark Office*